United States Patent

Cai et al.

[11] Patent Number: 5,990,216
[45] Date of Patent: Nov. 23, 1999

[54] METHOD FOR MANUFACTURING GRAFTED POLYACRYLAMIDE FLOCCULANT OF CATIONIC/AMPHOLYTIC IONS

[75] Inventors: Ziyun Cai; Huihua Yan; Yingxiang Tao, all of Guangzhou, China

[73] Assignee: Guangzhou Institute of Environmental Protection Sciences, Guangzhou, China

[21] Appl. No.: 08/897,164

[22] Filed: Jul. 18, 1997

[30] Foreign Application Priority Data

Apr. 11, 1997 [CN] China .................................. 97108880

[51] Int. Cl.[6] .......................... C08F 251/00; C08F 251/02
[52] U.S. Cl. .......................... 524/423; 524/317; 524/424; 524/846; 525/54.3; 525/54.31; 527/305; 527/306; 527/309; 527/312
[58] Field of Search ...................................... 527/305, 306, 527/309, 312; 525/54.3, 54.31; 524/317, 423, 424, 846

[56] References Cited

FOREIGN PATENT DOCUMENTS

| B-59-50682 | 12/1984 | Japan . |
| A-3-231903 | 10/1991 | Japan . |
| A-3-265605 | 11/1991 | Japan . |
| A-4-185621 | 7/1992 | Japan . |
| 109594 | 4/1996 | Japan . |
| 2261222 | 5/1993 | United Kingdom . |

OTHER PUBLICATIONS

Pan, "Study of Aminomethylation of Starch/Polyacrylamide", Shiyou Huagong 20(11), 1991 pp. 744–750.
Chemical Abstract 108:188748.
Chemical Abstract 116:256099.

*Primary Examiner*—David Buttner

[57] ABSTRACT

The present invention discloses a process for manufacturing a grafted polyacrylamide flocculant of cationic/ampholytic ions, which is characterized by graft-copolymerizing starch or micro-crystalline cellulose as backbone with acrylamide, while using potassium permanganate as initiator, hydrolyzing and thereafter reacting with alkyl-amino-carbinol. Optionally, the product may also contain additives. It has advantages in readily available raw materials, low cost of production, simple technology and mild reaction conditions. The product has good overall performance, high flocculating ability, wide applicability and is an ideal sludge-dewatering agent and sewage treating agent.

7 Claims, 1 Drawing Sheet

METHOD FOR MANUFACTURING GRAFTED POLYACRYLAMIDE FLOCCULANT OF CATIONIC/AMPHOLYTIC IONS

BACKGROUND OF THE INVENTION

1. Field of the Invention

The present invention relates to a process of production of a water-treating agent, in particular, relates to preparation of a grafted polyacrylamide flocculent containing cationic/ampholytic ions.

2. Description of the Related Art

Currently, with the development of environmental protection, requirement of water-treating agent becomes more and more urgent, and polyacrylamide is the most widely applied synthetic polymeric flocculant at present. But the production cost of polyacrylamide is relatively high. Therefore, the relevant professionals seek various approaches to lower cost and improve product performance. In particular, more attention is paid to cationic polyacrylamide, which is produced by copolymerizing a cationic monomer with acrylamide. For manufacturers in China the cationic monomer must be imported. Hence, development of a cationic flocculant with low cost of production, good performance and wide applicability is of real significance. Investigators, both domestic and abroad, paid attention to exploitative research of grafted polyacrylamide. In 80's decade, Chinese researchers succeeded in grafting acrylamide on to starch with cheap potassium permanganate instead of tetravalent cerium salt as initiator, and achieved high grafting efficiency and high degree of polymerization. It is a long step taken by acrylamide grafting technique toward industrial production. Due to the present of hydroxyl and amide functional groups and branched structure, the acrylamide grafted carbohydrate like starch has better flocculating effect than polyacrylamide under certain conditions, and further modifications may be made to give various derivatives to widen scope of application. No report on cationic modification of grafted polyacrylamide is found up to now. Domestically, though there is someone studied cationic modification of grafted polyacrylamide, but all carried out by direct reaction of formaldehyde with dimethylamine through classical Mannish reaction, which often results in crosslinking and product instability. Furthermore, a polyacrylamide with single cations in its structure is limited in application as a flocculating agent sometimes it must be used in combination with an anionic type polymeric flocculant, and thereby increasing trouble in operation. Additionally, owing to viscoelasticity, with increase of concentration, the mechanical load of stirring increased rapidly, which results in that the reaction is hard to control, and the product is also difficult to be diluted in use.

SUMMARY OF THE INVENTION

The present invention provides a modified cationic/ampholytic grafted polyacrylamide flocculant with low production cost, readily available raw materials, stable in storage, good performance and wide applicability.

The present invention also provides a process for manufacturing a modified graft starch of microcrystalline cellulose/acrylamide copolymer with both cationic and anionic or ampholytic ions in its structure as a flocculating agent. The copolymer is prepared first from starch or micro-crystalline cellulose and acrylamide as raw materials with potassium permanganate as initiator. Then the copolymer is modified by three steps: the copolymer prepared is hydrolyzed first with a solution of sodium hydroxide to convert a part of amide group in side chain of copolymer into carboxylic (acrylic)anionic groups, i.e., the resultant graft polyacrylamide comprises anionic groups or sodium acrylamide unit as well as amide groups. Then, the hydrolyzed product of copolymer is reacted with dialkylamino carbinol to obtain a cationic/ampholytic ion-containing graft polyacrylamide, thereby preparing a copolymer having moieties of starch of microcrystalline cellulose-acrylamide-sodium acrylatedialkylamino methylacrylamide in its structure. The third step of the present invention is relevant to addition of additives, such as water soluble inorganic salts or non-ionic surfactants, during of after the second step reaction in order to reduce viscosity of the reaction system and increase its fluidity, thereby making the reaction process easy to control and the final product easy to dilute for use.

DETAILED DESCRIPTION OF THE INVENTION

Figure 1:
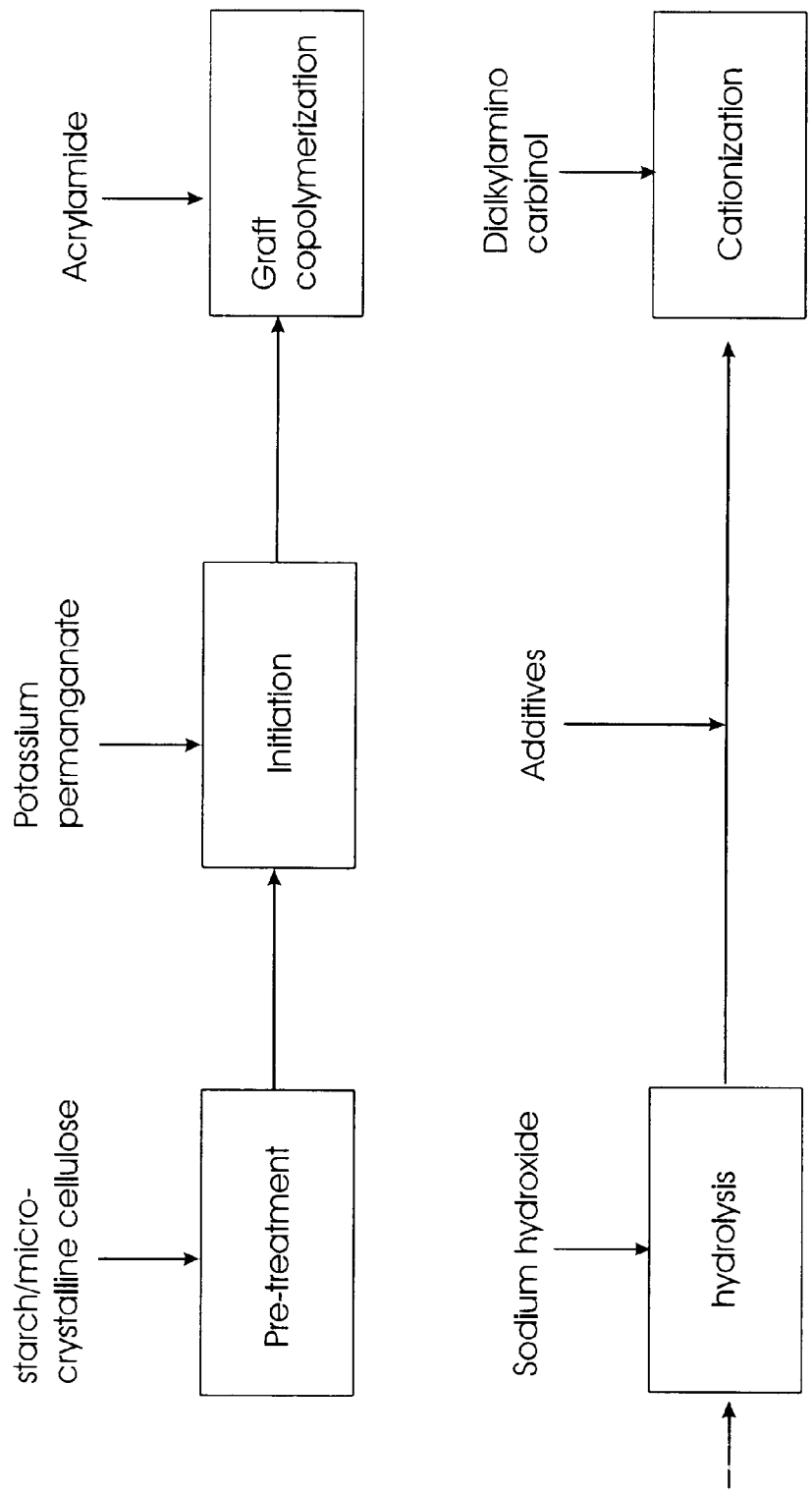
FIG. 1 is a flow diagram of the process of the present invention.

The present invention is carried out as follows:

The starch or micro-crystalline cellulose as backbone, using potassium permanganate as initiator, is graft-copolymerized with acrylamide to give starch-g-polyacrylamide or micro-crystalline cellulose-g-polyacrylamide. Then, the graft copolymer is reacted with sodium hydroxide, some amount of carboxyl groups introduced into it and so transformed into an anionic grafted polyacrylamide. On the other hand, an alkylamino carbinol is prepared by mixing formaldehyde with dimethylamine or diethylamine or the mixture thereof. Let the anionic grafted polyacrylamide react with the alkylamino carbinol and obtain the final product, cationic/ampholytic graft polyacrylamide flocculent, i.e. starch-g-poly(acrylamide-sodium acrylate-dialkylaminomethylated acrylamide) or micro-crystalline cellulose-g-poly-(acrylamide-sodium acrylate-dialkylaminomethylated acrylamide). The reactions proceed as follows:

1. Graft copolymerization:

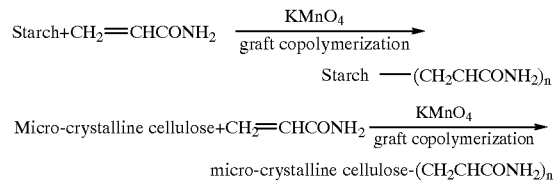

2. Hydrolysis: A part of amide groups are converted into carboxylic groups and a grafted polyacrylamide of anionic type is resulted.

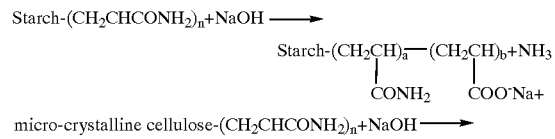

-continued micro-crystalline cellulose-$(CH_2-CH)_{\overline{a}}-(CH_2-CH)_b+NH_3$
                                    |                |
                                  $CONH_2$         $COO^-Na^+$ 3. Synthesis of alkylamino carbinol $R_2NH+HCHO \rightarrow R_2NCH_2OH$ Wherein R is $CH_2-$ or $C_2H_5-$ 4. Anionic grafted polyacrylamide reacting with alkylamino carbinol Starch-$(CH_2-CH)_{\overline{a}}-(CH_2-CH)_b+R_2NCH_2OH \longrightarrow$
                |                |
              $CONH_2$        $COONa$ Starch-$(CH_2-CH)_{\overline{p}}-(CH_2-CH)_{\overline{q}}-(CH_2CH)_r-$
                |                |                |
              $CONH_2$        $COONa$        $CONHCH_2NR_2$ micro-crystalline cellulose-$(CH_2-CH)_{\overline{a}}-(CH_2-CH)_b+R_2NCH_2OH \longrightarrow$
                                    |                |
                                  $CONH_2$        $COONa$ micro-crystalline cellulose-$(CH_2-CH)_{\overline{p}}-(CH_2-CH)_{\overline{q}}-(CH_2-CH)_r$
                                    |                |                |
                                  $CONH_2$        $COONa$        $CONHCH_2NR_2$ wherein R is $CH_3-$ or $C_2H_5-$; a+b=n, p=a, q=b The product is starch-(acrylamide-sodium acrylate-dialkylaminomethylated acrylamide)$_n$ or micro-crystalline cellulose-(acrylamide-sodium acrylate-dialkylaminomethylated acrylamide)$_n$:

The present invention will be described in detail in combination with FIG. 1 as follows.

As shown in FIG. 1, starch or micro-crystalline cellulose used as back-bone, using potassium permanganate as initiator, graft-copolymerizes with acrylamide to produce starch-g-polyacrylamide or micro-crystalline cellulose-g-polyacrylamide, wherein, the graft copolymer as basic polymer, after hydrolyzed with sodium hydroxide, is cationized by reacting with dialkylamino carbinol, additives being introduced either prior to or after the reaction. Formulation of reactants and conditions of reaction are as follows:

1. Grafting reaction:
Starch or micro-crystalline cellulose: acrylamide: water =1:(0.1~100):(10~5000)(by weight);
Concentration of potassium permanganate: 0.0003~0.03 mol/L;
Reaction temperature: 30~70° C.,
Reaction time: 0.5~24 hours.

2. Hydrolysis:
Acrylamide: sodium hydroxide=1:0.03~0.3(by weight);
Reaction temperature: 30~95° C.;
Reaction time: 0.5~24 hours.

3. Preparation of dialkylamino carbinol
Dimethylamine: Diethylamine=100:0~0:100;
Formaldehyde: amine=1:0.1~5(mole ratio);
Reaction temperature: room temperature;
Reaction time: 0.2 hour or longer 4. Cationization reaction:
Acrylamide unit in the graft copolymer: formaldehyde= 1:0.1~5(mole ratio);
Reaction temperature: 30~70° C.;
Reaction time: 0.4~24 hours.

Prior to or after reaction, water soluble inorganic salts or nonionic surfactants are added at level of 0.1%~5% of the system (by weight).

In the present invention, starch-g-polyacrylamide or micro-crystalline cellulose-g-polyacrylamide is used as basic polymer, which has hydroxyl and amide groups and branched structure, properly distributed flocculating functional groups, and hence facilitates "bridging" in the course of flocculation. Introduction of anionic groups and there after cationized, not only provides two kinds of functional groups and enlarges the scope of applicability of the product, but also extends the molecular chain formerly coiled due to intra-molecular hydrogen bonding by introducing carboxlic groups which cause repulsion, and facilitated cationization. In addition, use of alkylamino carbinol instead of direct addition of formaldehyde and dimethylamine in the present invention avoids the formation of the following intermediate structure unit:

$-CH_2-CH-$
          |
      $CONH_2CH_2OH$ and therefore avoiding crosslinking of $-CH_2-CH-$
          |                    $\xrightarrow{crosslinking}$
      $CONHCH_2OH$ $-CH_2-CH-$
          |
      $CONHCH_2$
               $>O$
      $CONHCH_2$
          |
$-CH_2-CH-$ thus conferring good stability on the product.

Addition of water soluble inorganic salts or non-ionic surfactants in the present invention is for the sake of depressing viscosity of product, improving fluidness, better controlling of reaction course and better solubility of the product.

The said inorganic salts include potassium, sodium, ammonium sulfate, carbonate and the likes; the said non-ionic surfactants include polyglycol non-ionic surfactants and polybasic alcohol non-ionic surfactants, and the likes.

The present invention has advantages in readily available raw materials, low cost of production, simple technology, mild reaction conditions, good overall performance of product, high flocculating ability, and wide scope of applicability. It is suitable for sludge dewatering and various industrial sewage treatment. The embodiments of present invention are as follows:

EXAMPLE 1

3 g. of starch is suspended in 60 ml of water and gelatinized for 0.5 hour, 3 ml. of 0.1 mol/L $KMnO_4$ solution is added after cooling to 50° C., $N_2$ is passed in for 0.5 hour, then 6 g. of acrylamide is introduced, the reaction is allowed to proceed for 2 hours. 120 ml. of water and 1.2 ml. of 30% sodium hydroxide solution are added to above mentioned reaction mixture under stirring and let it to react for one hour. Previously, a mixture of 19.2 ml of 40% dimethylamine and 2.28 ml. of 37% formaldehyde is prepared and cooled to 50° C. Then, the alkylamino carbinol so prepared is added into the above mentioned system and let it react for another 2 hours. After completion of reaction, 2 g of ammonium bicarbonate and 2 g. of polyglycol mono-laurate were added.

EXAMPLE 2

2 g. of micro-crystalline cellulose is suspended in 40 ml of water, 4 ml. of 0.1 mol/L $KMnO_4$ solution is added at 60°

C. and $N_2$ is passed in for 0.5 hour, then 5 g. of acrylamide is introduced and let it react for 2 hours, diluted with 100 ml. of water and raise the temp. to 70° C., 0.8 ml. of 30% NaOH solution is added under stirring and let hydrolysis run for 1 hour, then 1.4 g. of sodium sulfate and 1.4 g. nonyl-phenol EO adduct are added. A pre-prepared mixture of 3.7 ml. of 40% dimethylamine and 5.3 ml. of formaldehyde is introduce to the above mentioned system, and allowed to react for 0.5 hour.

EXAMPLE 3

5 g. of starch is suspended in 120 ml. of water and is gelatinized at 95° C. for 20 minute, 10 mll of 0.1 mol/L $KMnO_4$ solution is added after cooling to 30° C., $N_2$ is passed in for 0.5 hour, and then 10 g. of acrylamide is introduce, reaction takes place for 24 hours. At 60° C., 2 ml. of 30% NaOH solution is added to the above mentioned mixture, and let it react for another 2 hours, and 3 g. of sodium sulfate is added and stirred to homogeneous. A pre-prepared mixture of 1.9 ml. of 40% dimethylamine, 7.6 ml. of 60% diethylamine and 11.4 ml. of 37% formaldehyde is added to the above mentioned system at 40° C. and allowed to react for 24 hours. Finally 13 ml. of dimethyl sulfate is added.

What is claimed is:

1. A process for manufacturing a modified cationic/ampholytic ion-containing graft starch/acrylamide or microcrystalline cellulose/acrylamide copolymer, comprising the steps of:

(1) partially hydrolyzing the graft starch or microcrystalline cellulose/acrylamide copolymer with sodium hydroxide to convert a part of the amide groups in acrylamide units thereof into carboxylic anionic groups or sodium acrylate, thereby forming a grafted polyacrylamide which contains both acrylamide and sodium acrylate units in structure, according to the following equations:

Starch-$(CH_2CHCONH_2)_n$+NaOH ⟶

Starch-$(CH_2CH)_a$—$(CH_2CH)_b$+$NH_3$
         |                    |
         $CONH_2$      $COO^-Na^+$ micro-crystalline cellulose-$(CH_2CHCONH_2)_n$+NaOH ⟶ micro-crystalline cellulose-$(CH_2-CH)_a$—$(CH_2-CH)_b$+$NH_3$
                            |              |
                            $CONH_2$   $COO^-Na^+$ (2) reacting a product of step (1) with dialkylamino carbinol to further introduce cationic groups of dialkylaminomethylamide into the hydrolyzed graft polyacrylamide, thereby obtaining a cationic/ampholytic ion-containing graft polyacrylamide, according to the following equations:

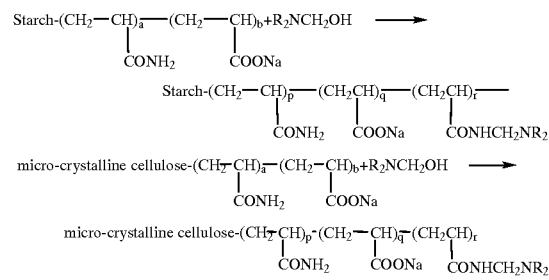

wherein R is $CH_3$— or $C_2H_5$—; a+b=n, p=a, q+Y=b; and (3) adding at least one additive selected from the group consisting of water soluble inorganic salts and non-ionic surfactants to the reaction system to improve the viscosity of the product.

2. The process for manufacturing a modified cationic/ampholytic ion-containing graft starch/acrylamide or microcrystalline cellulose/acrylamide copolymer according to claim 1, wherein the step (3) is carried out prior to the step (2).

3. The process for manufacturing a modified cationic/ampholytic ion-containing graft starch/acrylamide or microcrystalline cellulose/acrylamide copolymer according to claim 1, wherein the step (1) is carried out at a temperature of from about 30–95° C. for about 0.5–24 hours and in the ratio of acrylamide:NaOH=1:0.03–0.3 (wt. ratio).

4. The process for manufacturing a modified cationic/ampholytic ion-containing graft starch/acrylamide or microcrystalline cellulose/acrylamide copolymer according to claim 1, wherein the step (2) is carried out at a temperature of from about 30–70° C. for about 0.4–24 hours and in the ratio of acrylamide unit in the graft copolymer:formaldehyde=1:0.1–5 (mole ratio).

5. The process for manufacturing a modified cationic/ampholytic ion-containing graft starch/acrylamide or microcrystalline cellulose/acrylamide copolymer according to claim 1, wherein the amount of additives used in step (3) is in a range of from about 0.1% to 5% (by wt. ratio).

6. The process for manufacturing a modified cationic/ampholytic ion-containing graft starch/acrylamide or microcrystalline cellulose/acrylamide copolymer according to claim 1, wherein in step (3), the additives are water soluble inorganic salts selected from the group consisting of sodium sulfates and carbonates, potassium sulfates and carbonates, ammonium sulfates and carbonates.

7. The process for manufacturing a modified cationic/ampholytic ion-containing graft starch/acrylamide or microcrystalline cellulose/acrylamide copolymer according to claim 1, wherein in step (3), the additives are non-ionic surfactants selected from the group consisting of polyethylene glycol non-ionic surfactants and polybasic alcohol non-ionic surfactants.

* * * * *